United States Patent
Plaisted et al.

(10) Patent No.: US 8,892,684 B2
(45) Date of Patent: Nov. 18, 2014

(54) DYNAMIC SELECTION OF RESOURCES FOR COMPRESSION IN A CONTENT DELIVERY NETWORK

(75) Inventors: Patrick E. Plaisted, Redmond, WA (US); Aravind Krishnamachari Seshadri, Redmond, WA (US); Johannes Klein, Sammamish, WA (US); Christopher E. Mitchell, Snoqualmie, WA (US); Anand Muthurajan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 13/480,498

(22) Filed: May 25, 2012

(65) Prior Publication Data
US 2013/0318197 A1 Nov. 28, 2013

(51) Int. Cl.
*G06F 15/16* (2006.01)

(52) U.S. Cl.
USPC ............ 709/217; 709/225; 709/226; 709/229

(58) Field of Classification Search
USPC .................................. 709/225, 226, 229, 217
See application file for complete search history.

(56) References Cited

U.S. PATENT DOCUMENTS

| | | | |
|---|---|---|---|
| 7,395,355 B2 | 7/2008 | Afergan et al. | |
| 7,937,478 B2 | 5/2011 | Cheng et al. | |
| 7,975,071 B2 | 7/2011 | Ramjee et al. | |
| 8,060,613 B2 | 11/2011 | Farber et al. | |
| 8,326,955 B2 * | 12/2012 | Airo et al. | 709/222 |
| 2002/0016828 A1 | 2/2002 | Daugherty et al. | |
| 2002/0099829 A1 * | 7/2002 | Richards et al. | 709/227 |
| 2007/0271385 A1 | 11/2007 | Davis et al. | |
| 2008/0065745 A1 | 3/2008 | Leighton et al. | |
| 2010/0312821 A1 | 12/2010 | Bannoura et al. | |
| 2012/0226766 A1 | 9/2012 | Fainberg et al. | |
| 2012/0284239 A1 * | 11/2012 | Agarwala et al. | 707/693 |

OTHER PUBLICATIONS

Dong, et al., "Proxy-based Object Packaging and Compression: A Web Acceleration Scheme for UMTS", Retrieved at <<http://ieeexplore.ieee.org/stamp/stamp.jsp?tp=&arnumber=5303682>>, In the proceeding of 5th International Conference on Wireless Communications, Networking and Mobile Computing, Sep. 24, 2009, pp. 5.

Armstrong, Nicholas D. R., "Just-In-Time Push Prefetching: Accelerating the Mobile Web", Retrieved at <<http://www.uwspace.uwaterloo.ca/bitstream/10012/6256/1/Armstrong_Nicholas.pdf>>, In the Theses and Dissertations of Faculty of Engineering, Mar. 11, 2011, pp. 103.

(Continued)

*Primary Examiner* — Liangche A Wang
(74) *Attorney, Agent, or Firm* — Bryan Webster; Kate Drakos; Micky Minhas

(57) ABSTRACT

Embodiments provide a compression proxy service that dynamically selects resources or other content for compression and delivery to user devices. The resources are selected based on evaluation of compression characteristics relating to the resources. A manifest is defined to identify the selected resources, or to identify the resources not selected for processing by the compression proxy service. The user devices employ the manifest to determine whether to send requests for the resources to the compression proxy service or to another source (e.g., an origin web site). Some embodiments provide a reduction in network traffic while making efficient use of the compression proxy service.

20 Claims, 4 Drawing Sheets

(56) References Cited

OTHER PUBLICATIONS

"Riverbed Stingray Product Family", Retrieved at <<http://www.riverbed.com/assets/media/documents/brochures/ProductBrochure_Stingray_Product_Family.pdf>>, Retrieved Date: Nov. 20, 2012, pp. 8.

Darragh, Jim, "Comment: Preparing for website traffic peaks", Retrieved at <<http://www.retail-week.com/comment/efashion-blog/comment-preparing-for-website-traffic-peaks/5037443.article>>, Jun. 20, 2012, pp. 2.

Anderson, Rick, "Bundling and Minification", Retrieved at <<http://www.asp.net/mvc/tutorials/mvc-4/bundling-and-minification>>, Aug. 23, 2012, pp. 10.

"Optimize caching", Retrieved at <<https://developers.google.com/speed/docs/best-practices/caching>>, Retrieved Date: Nov. 20, 2012, pp. 4.

Balliauw, Maarten, "Using the Windows Azure Content Delivery Network", Retrieved at <<http://acloudyplace.com/2012/04/using-the-windows-azure-content-delivery-network/>>, Apr. 5, 2012, pp. 6.

* cited by examiner

DYNAMIC SELECTION OF RESOURCES FOR COMPRESSION IN A CONTENT DELIVERY NETWORK

BACKGROUND

Some existing proxy services act as intermediaries between user devices and content provider web sites. For example, rather than sending a request for content associated with a web page to the content provider web site, the user device may send the request to a third party proxy service. The third party proxy service obtains the content on behalf of the user device, and may perform compression on the content before sending the content to the user device. The amount of compression varies based on the content being compressed, among other factors. For example, compressed images generally do not compress further without sacrificing image quality. As such, the costs associated with use of the existing proxy services may outweigh the savings in size reduction from the compression. Additionally, the existing proxy services take an all-or-nothing approach to compression by compressing either all the resources or none of the resources.

SUMMARY

Embodiments of the disclosure enable selective use of a compression proxy service to reduce network traffic when providing resources. The compression proxy service receives a request for the resources and evaluates at least one compression characteristic of the resources. One or more of the resources are selected based on the evaluated compression characteristic. A manifest is defined to indicate selection of the one or more of the resources.

In some embodiments, a computing device detects a request for at least one of the resources and receives the manifest in response to the detected request. Based on the received manifest, the computing device identifies the selected one or more of the resources to obtain from the compression proxy service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
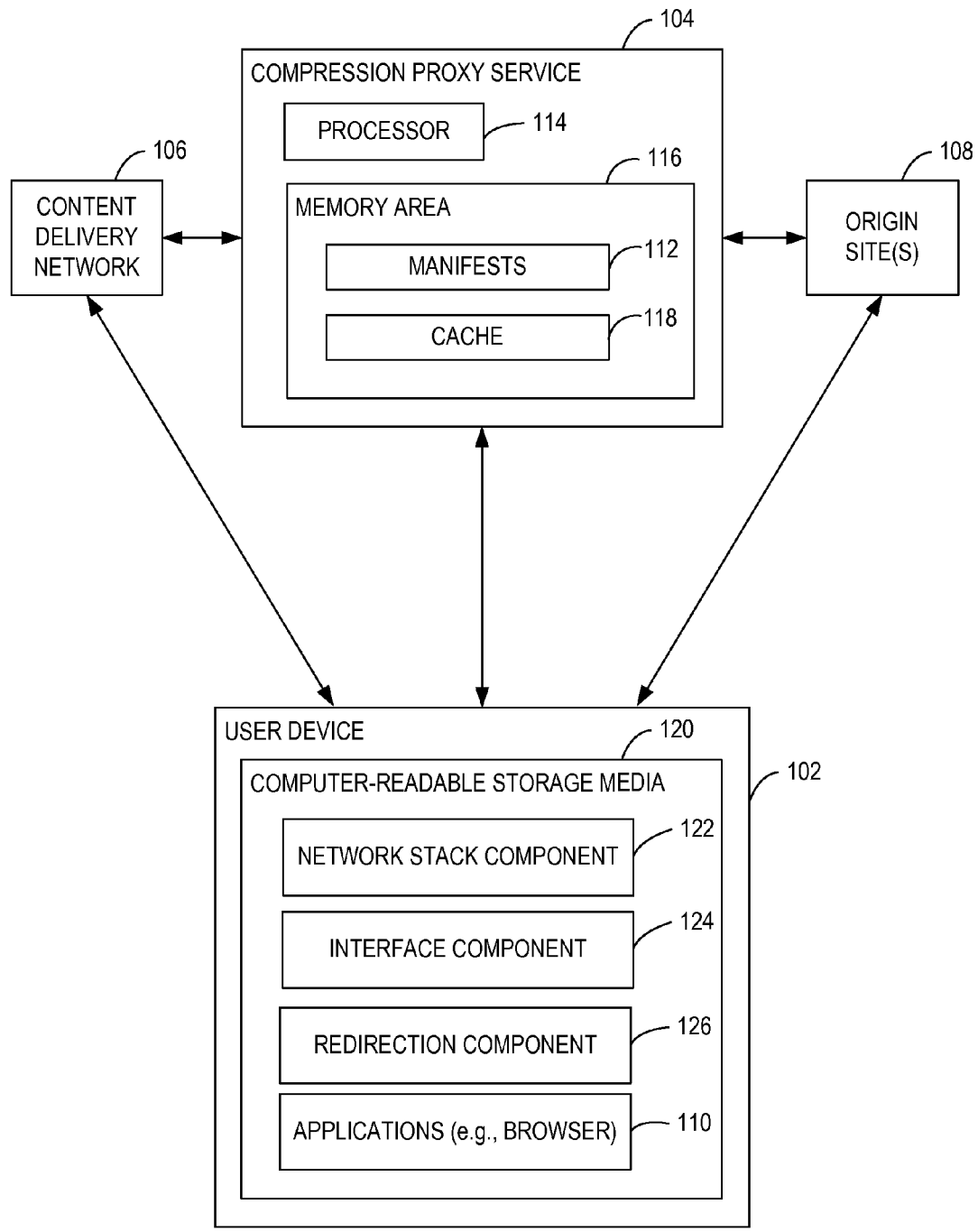
FIG. 1 is an exemplary block diagram illustrating a user device interacting with a compression proxy service.

Referring to the figures, embodiments of the disclosure enable a dynamic, intelligent data compression proxy service 104 that adapts its behavior based on calculated compression characteristics. In some embodiments, the compression proxy service 104 calculates the compression characteristics for the resources associated with web pages to select resources for processing by the compression proxy service 104 (e.g., rather than by an origin site 108 or other content provider web site). For example, the compression proxy service 104 selects the resources that have a high compression ratio, or excludes the resources that have a low compression ratio. Another compression characteristic calculated by the compression proxy service 104 is the amount of noise or artifacts resulting from the compression. In such embodiments, the compression proxy service 104 calculates and evaluates (e.g., compares to a threshold) the peak signal-to-noise ratios for the compressed resources. In this manner, the compression proxy service 104 is able to intelligently compress the resources as much as possible without introducing noise or artifacts that affect the quality of the compressed resources.

In some embodiments, the selected, or excluded, resources on a web page are identified in a manifest 112 or other record for the web page that is provided to one or more user devices 102 in response to a request for the web page from the user devices 102. The user devices 102 use the manifest 112 to efficiently load compressed versions of the selected resources from the compression proxy service 104 while obtaining the other resources on the web page from other sources (e.g., the origin site 108). Some embodiments adapt to changing web pages by continually monitoring the requests for resources associated with the web pages, periodically calculating the compression characteristics for the resources, and updating the manifests 112 accordingly.

Aspects of the disclosure reduce a quantity of network traffic consumed by the user device 102 while rendering web pages. Aspects of the disclosure further make efficient use of the compression proxy service 104 and its content delivery network 106 by invoking the compression proxy service 104 (or its content delivery network 106) for only the resources that yield the greatest savings in network traffic. For devices having a small display, aspects of the disclosure may select images originally compressed for display on a large monitor for further compression because the further compression still yields an acceptable image quality on the small display.

Further, static, long-lived compressed content with high popularity may be stored on the content delivery network 106 for faster and cheaper downloading by the user devices 102. In contrast, requests for resources such as video, images, or other content that does not compress much are routed to the origin site 108.

Referring to FIG. 1, an exemplary block diagram illustrates the user device 102 interacting with the compression proxy service 104. The example of FIG. 1 represents a system for selective use of the compression proxy service 104 to reduce network traffic when rendering content such as resources associated with web pages. The user device 102 interacts with the compression proxy service 104 to determine whether to request the resources from the compression proxy service 104, the content delivery network 106, or an origin site(s) 108 associated with one or more of the resources.

The compression proxy service 104 may be implemented as one or more computing devices or other processing units (e.g., as a cloud service). The computing device represents any device executing instructions (e.g., as application programs, operating system functionality, or both) to implement the operations and functionality associated with the compression proxy service 104.

The compression proxy service 104 has at least one processor 114 and a memory area 116. The processor 114 includes any quantity of processing units, and is programmed to execute computer-executable instructions for implementing aspects of the disclosure. The instructions may be performed by the processor 114 or by multiple processors executing within the compression proxy service 104, or performed by a processor external to the compression proxy service 104. In some embodiments, the processor 114 is programmed to execute instructions such as those illustrated in the figures (e.g., FIG. 2).

The memory area 116 includes any quantity of media associated with or accessible by the compression proxy service 104. The memory area 116 may be internal to the compression proxy service 104 (as shown in FIG. 1), external to the compression proxy service 104 (not shown), or both (not shown). The memory area 116 stores, among other data, data identifying the resources (e.g., content) and locations (e.g., network locations) from which the resources may be obtained. For example, the network locations may include the content delivery network 106, the origin site(s) 108 for one or more of the resources, or a cache 118 of the compression proxy service 104.

Aspects of the disclosure are operable with any size, quantity, format, or configuration of the manifests 112. For example, each of the manifests 112 may be associated with a single web page. In another example, each manifest 112 may be associated with a plurality of web pages. In still another example, the memory area 116 stores a single, aggregated manifest for the web pages. Creation of the manifests 112 is described below with reference to FIG. 2. An exemplary structure and format of the manifest 112 is provided in Appendix A.

The compression proxy service 104 sends the manifests 112 to the user device 102 upon request. In some embodiments, the compression proxy service 104 receives a request for a web page from the user device 102 and provides the manifest 112 corresponding to the web page in response thereto. In other embodiments, the compression proxy service 104 determines the resources associated with the web page and dynamically generates the manifest 112 to identify the locations associated with the determined resources.

In some embodiments, the compression proxy service 104 selectively analyzes web pages and creates manifests for only those web pages with sufficient popularity. For example, the compression proxy service 104 may maintain a popularity counter for each web page reflecting a quantity of requests for the web page. In this example, the compression proxy service 104 performs the operations illustrated in FIG. 2 for only those web pages having a value in the popularity counter that exceeds a threshold value. This enables more efficient use of the compression proxy service 104 because manifests 112 are then created only for popular web pages. In other embodiments, the compression proxy service 104 creates a "reject all" manifest 112 for the unpopular web pages (e.g., those web pages having a value for the popularity counter that does not exceed the threshold value) which directs the user device 102 to obtain all resources for a particular web page from the origin site 108, rather than from the compression proxy service 104 or the content delivery network 106.

The memory area 116 further includes the cache 118 for storing compressed versions of one or more of the resources requested by the user device 102.

The user device 102 represents any device requesting resources or other content. For example, the user device 102 may include a mobile computing device or any other portable device. In some embodiments, the mobile computing device includes a mobile telephone, laptop, tablet, computing pad, netbook, gaming device, and/or portable media player. The user device 102 may also include less portable devices such as desktop personal computers, kiosks, and tabletop devices. Additionally, the user device 102 may represent a group of processing units or other computing devices.

The user device 102 includes, or has access to, one or more computer-readable storage media 120. The computer-readable storage media 120 store, among other data, one or more applications 110. The applications 110, when executed by the user device 102, operate to perform functionality on the user device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network. For example, the applications 110 may represent downloaded client-side applications that correspond to server-side services executing in a cloud.

The computer-readable storage media 120 further embody or otherwise store one or more computer-executable components. Exemplary components include a network stack component 122, an interface component 124, and a redirection component 126. Operation of these components, when executed by the user device 102, is described below with reference to FIG. 4.

Figure 2:
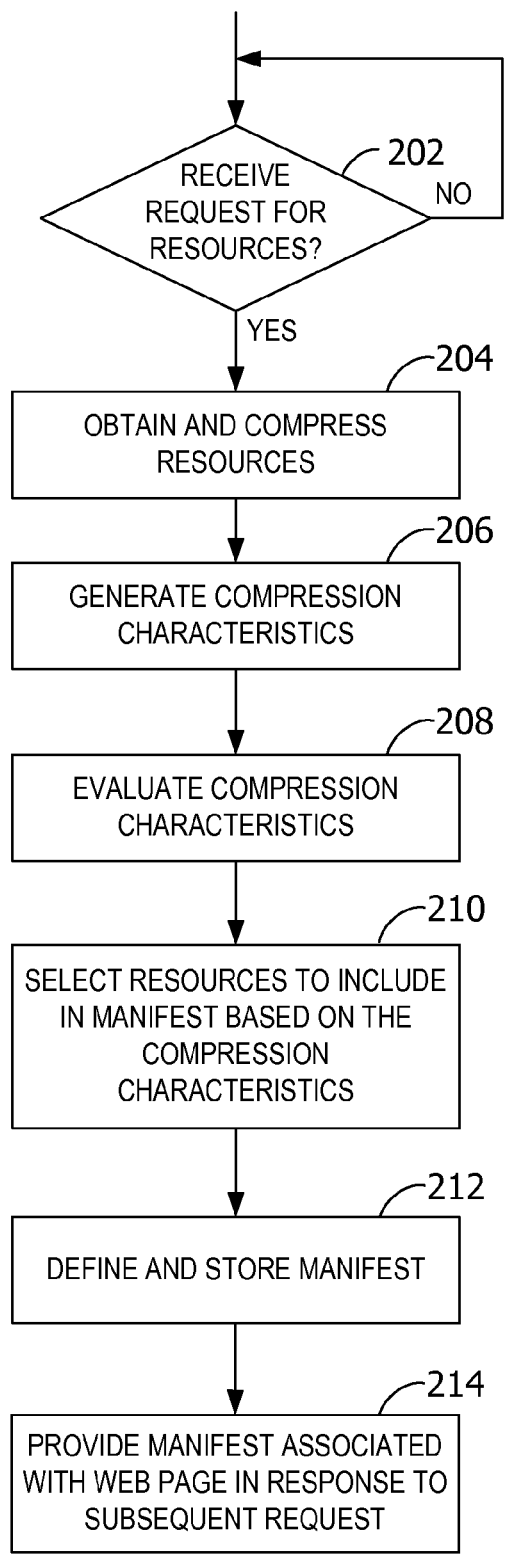
FIG. 2 is an exemplary flow chart illustrating operation of the compression proxy service to define manifests based on compression characteristics of resources.

Referring next to FIG. 2, an exemplary flow chart illustrates operation of the compression proxy service 104 to define manifests 112 based on compression characteristics of resources. In the example of FIG. 2, in response to receiving a request (e.g., a first request) for a resource associated with a web page from the user device 102, the compression proxy service 104 creates the manifest 112 for the web page and provides the created manifest 112 in response to subsequent requests for the web page. In other examples (not shown in FIG. 2), the compression proxy service 104 already stores (e.g., in the memory area 116) a previously created manifest 112 for the web page and provides this manifest 112 in response the received request.

In FIG. 2, the compression proxy service 104 listens for requests from the user device 102 for one or more of the resources at 202. For example, a request for a web page associated with the resources may be received. In response to receiving the request and after determining that the manifest 112 has not been created for the web page, the compression proxy service 104 obtains and compresses each of the resources at 204. For example, the compression proxy service 104 communicates with the origin sites 108 storing each of the requested resources.

Aspects of the disclosure are operable with execution of any kind or quantity of compression algorithms. One or more compression characteristics are generated at 206 for each of the resources based on execution of the compression algorithm. The compression characteristics chosen to be generated by the compression proxy service 104 may be dependent on the particular compression algorithm used. Exemplary compression characteristics include, but are not limited to, a compression rate and/or a compression quality. The compression rate may be expressed as a percentage or other metric or value. The compression quality may be expressed by any metric or value indicating a difference between a compressed version of the resource and an uncompressed version of the resource.

The compression proxy service 104 evaluates the generated compression characteristics at 208. For example, the compression characteristics may be compared against corresponding threshold values. In some embodiments, the compression rate for each resource may be compared to a threshold compression rate. Alternatively or in addition, the compression quality for each resource may be compared to a threshold compression quality.

At 210, the compression proxy service 104 selects one or more of the resources to include in the manifest 112 for the web page based on the evaluation of the compression characteristics. For example, if the compression rate of one of the resources meets or exceeds the threshold compression rate or otherwise compresses well or favorably, the compression proxy service 104 selects the resource for inclusion in the manifest 112. Alternatively or in addition, if the compression quality of one of the resources meets or exceeds the threshold compression quality or otherwise compares well or favorably to the uncompressed version of the resource, the compression proxy service 104 selects the resource for inclusion in the manifest 112.

In some embodiments, the inclusion or identification of one of the resources in the manifest 112 indicates that the compression proxy service 104 has decided, based on evaluation of the compression characteristics, that the compression proxy service 104 intends to provide compressed versions of the selected resources in response to subsequent requests for the selected resources. In this manner, the compression proxy service 104 is able to choose which resources to obtain and compress resulting in efficient use of the compression proxy service 104 (e.g., reduced network traffic).

In some embodiments, the compression proxy service 104 further caches or otherwise stores the compressed versions of only the selected resources for delivery in response to subsequent requests for the resource. For example, compressed versions of frequently requested resources may be cached.

At 212, the compression proxy service 104 defines the manifest 112 for the web page to include an identification of the selected resources. Aspects of the disclosure are operable with any form or format of the manifest 112 as well as any indication that compressed versions of the selected resources are available from the compression proxy service 104. The defined manifest 112 is stored in the memory area 116 accessible to the compression proxy service 104.

In response to a subsequent request (e.g., a second request) for the web page, the compression proxy service 104 sends, transmits, or otherwise provides the manifest 112 to the requesting user device 102 at 214. The user device 102 uses the manifest 112 to identify which of the plurality of resources associated with the web page to obtain from the compression proxy service 104 instead of from the origin site 108, or other source. The user device 102 sends requests for the resources associated with the web page to either the compression proxy service 104 or the origin site 108 (see FIG. 4). If the compression proxy service 104 has cached a compressed version of any of the resources, the compression proxy service 104 provides the cached, compressed versions in response to the request from the user device 102.

In the example of FIG. 2, the inclusion of a resource in the manifest 112 indicates that the resource should be obtained, or is otherwise capable of being obtained, by the user device 102 from the compression proxy service 104. In other examples (not shown), the manifest 112 identifies each of the resources associated with the web page and identifies the locations (e.g., the compression proxy service 104 or the origin sites 108) from which the resources should be obtained.

In still another example (not shown), the inclusion of a resource in the manifest 112 indicates that the resource should be obtained by the user device 102 from the origin site 108. In such embodiments, the manifest 112 identifies the resources to be downloaded from the origin site 108 rather than the compression proxy service 104. The identified resources may be listed in a ResourceExclusions field as a collection of short hashes corresponding to URLs for each of the identified resources that should be downloaded from the origin site 108. The ResourceExclusions field may include a set of hashes such as the following:

```
<ExcludedResources>
    <Hash>1f2e3d4c</Hash>
    <Hash>baadbeef</Hash>
</ExcludedResources>
```

The criteria for including one of the resources in the ResourceExclusions field include one or more of the following:
- the resource does not compress greater than 10%
- the resource is of a type that is unsupported (e.g., video)
- the resource is marked as non-cacheable
- the resource is a streaming URL
- the resource is too large (e.g., greater than 5 MB)
- the resource cannot be obtained by the compression proxy service 104

In still another example (not shown), one or more of the generated compression characteristics are stored in the manifest 112. In such an example, for each of the resources, the user device 102 (rather than the compression proxy service 104) performs the evaluation of the corresponding compression characteristic to determine whether to obtain the resource from the compression proxy service 104 or the origin site 108. In this manner, each of the user devices 102 may apply different thresholds for determining whether the resource should be obtained from the compression proxy service 104 or the origin site 108.

Also, while described in some embodiments as a choice between obtaining the resources from the compression proxy service 104 or the origin site 108, other content sources are contemplated. For example, the compression proxy service 104 may identify which of the resources are popular based on a frequency of requests for the resources. The compression proxy service 104 notifies the content delivery network 106 of the identified resources to prompt the content delivery network 106 to obtain, compress, store, and provide compressed versions of the identified resources responsive to requests therefor. Alternatively, the compression proxy service 104 may provide compressed versions of the identified resources for storage by the content delivery network 106.

In such embodiments, the manifest 112 is updated to indicate that the identified resources are available from the content delivery network 106. For example, the manifest 112 may include a CdnInclusion field identifying the resources available from the content delivery network 106. Exemplary configuration rules for determining whether one of the resources should be made available from the content delivery network 106 include one or more of the following:
- the resource is cacheable
- the time-to-live (TTL) of the resource is long (e.g., greater than 60 min), or comparable to a configurable threshold
- the resource compresses at least 25%, or comparable to a configurable threshold
- the size of the resource is between 2K and 5 MB, or comparable to a configurable threshold
- the resource is popular, as tracked by a resource popularity counter (e.g., more than 25 requests for the resource every 5 minutes) that tracks number of visits per hour relative a configurable threshold Further, while the operations illustrated in FIG. 2 correspond to creation and definition of the manifests 112, aspects of the disclosure iteratively perform one or more of the operations to implement machine learning to dynamically update and maintain the manifests 112 based on the most recent compression characteristics. For example, the evaluation of the compression characteristics, selection of resources for inclusion in the manifest 112, and updating of the manifest 112 represent or correspond to machine learning operations.

Examples of threshold setting relating to creation of manifests 112 are shown in Appendix B.

Figure 3:
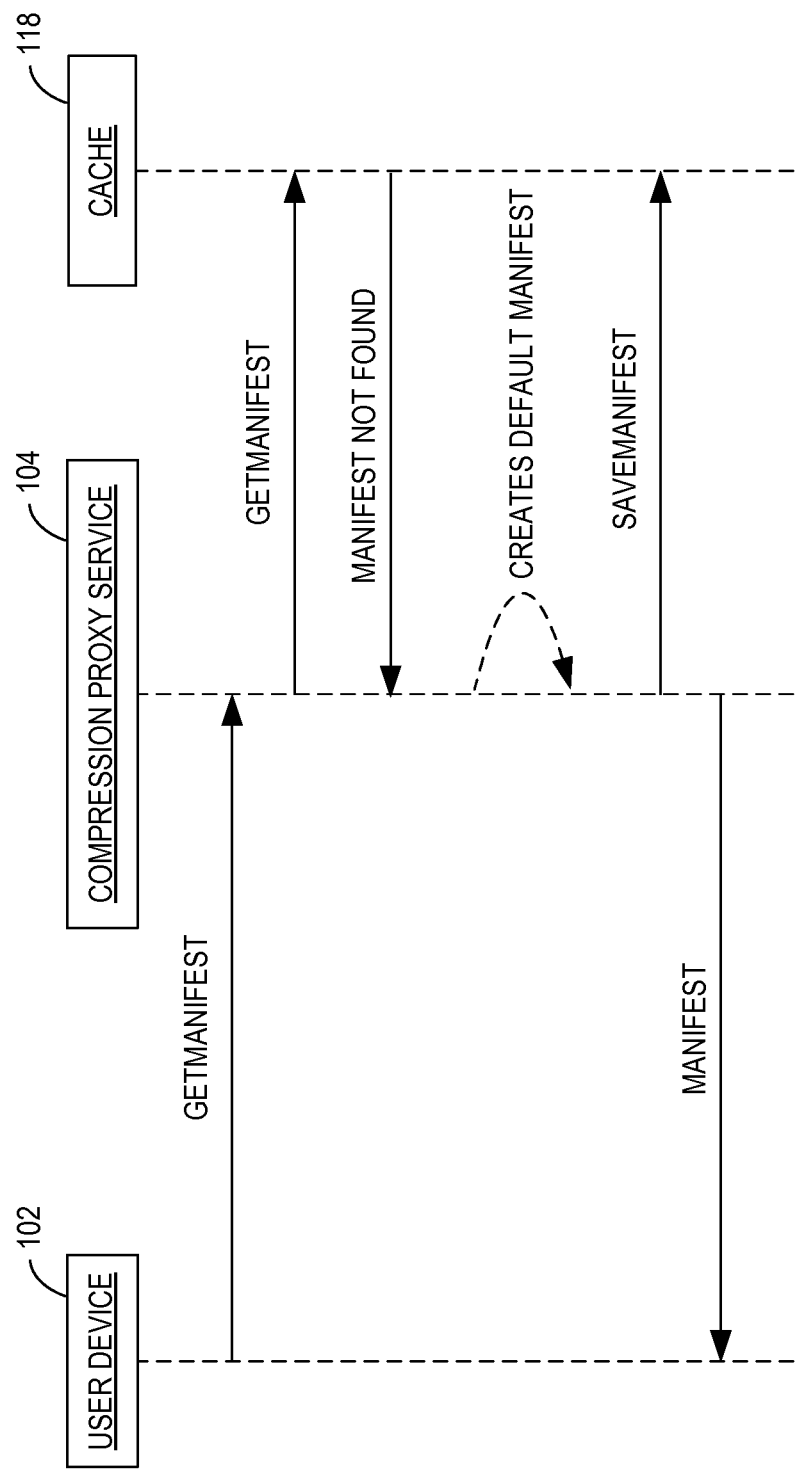
FIG. 3 is an exemplary sequence diagram illustrating creation of a manifest.

Referring next to FIG. 3, an exemplary sequence diagram illustrates creation of the manifest 112 for a web page. The user device 102 (e.g., via a network stack or other component) sends an application programming interface (API) call such as GetManifest(Web Page) to the compression proxy service 104. The compression proxy service 104 searches the cache 118 for the manifest 112 corresponding to the requested Web Page. If the manifest 112 is found (not shown), the compression proxy service 104 provides the manifest 112 to the user device 102. If the manifest 112 is not found, as in FIG. 3, the compression proxy service 104 creates a new or default manifest 112 by executing, for example, the operations illustrated in FIG. 2. The new, original, or default manifest 112 instructs the user device 102 to obtain each of the resources from the compression proxy service 104 (except for globally excluded resources such as video). In this manner, the compression proxy service 104 has the opportunity to compress and analyze each of the resources to decide which resources, in response to subsequent or future requests, should be handled by the compression proxy service 104. The manifest 112 is saved to the cache 118 and provided to the user device 102.

Figure 4:
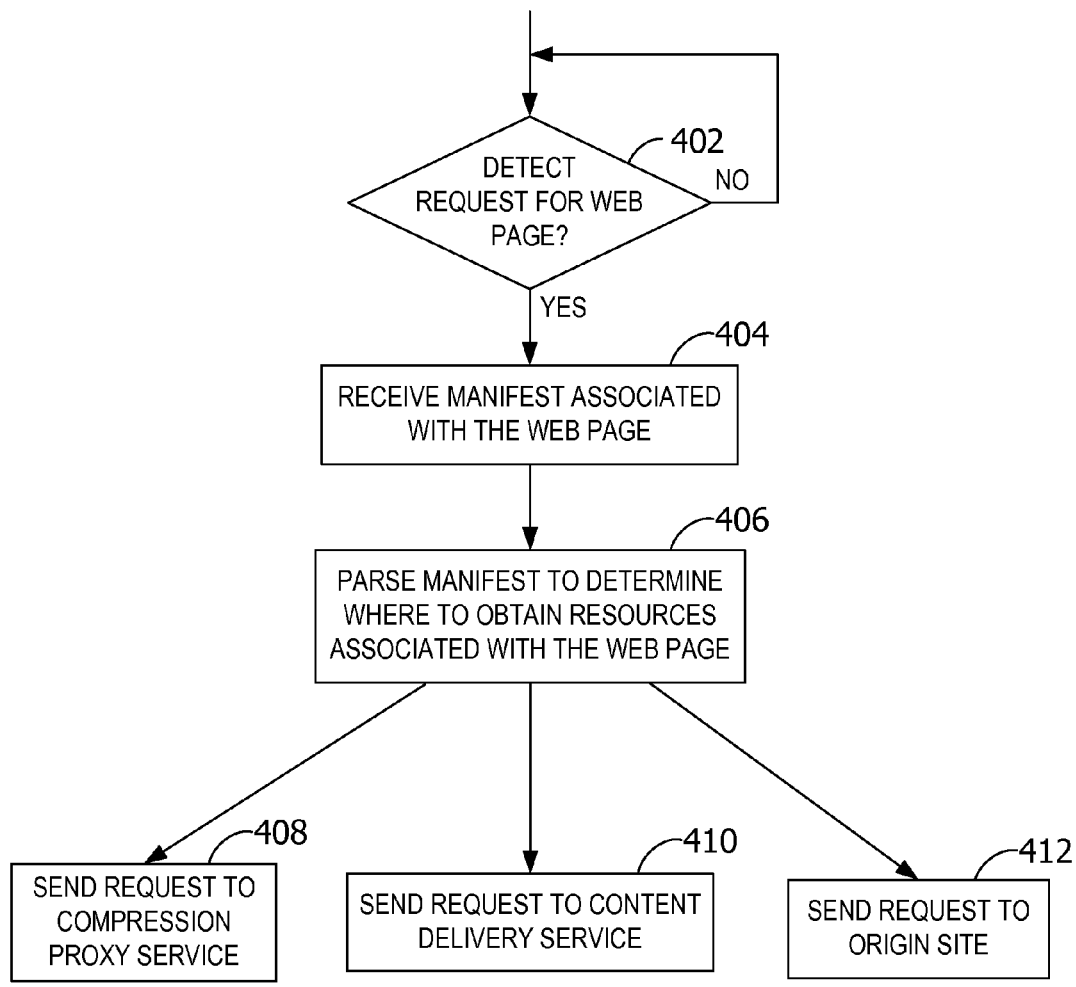
FIG. 4 is an exemplary flow chart illustrating operation of a user device to request resources from locations identified in a manifest.

Referring next to FIG. 4, an exemplary flow chart illustrates operation of the user device 102 to request resources associated with a web page from locations identified in the manifest 112 for the web page. The operations illustrated in FIG. 4 are executed, in some embodiments, by a network stack executing on the user device 102 that is browsing for content (e.g., on the Internet or other network). Each web page may have a plurality of the resources associated therewith. As described further below, the user device 102 chooses, based on the manifest 112, whether to send requests for resources to the compression proxy service 104, to the content delivery network 106, or to the origin site(s) 108 associated with each resource.

If a request for a web page is detected at 402, the user device 102 subsequently receives the manifest 112 for the web page at 404. For example, the user device 102 may request the manifest 112 (e.g., from the compression proxy service 104), or the user device 102 requests the web page but instead first receives the manifest 112 corresponding thereto. The request may include, for example, the URL of the web page. In some embodiments, the user device 102 caches the received manifest 112 for some duration (e.g., time to live).

At 406, the user device 102 parses the manifest 112 to identify the locations at which each of the resources associated with the web page are available. The user device 102 sends each of the requests for one of the resources to the identified locations. For example, the user device 102 may send, for one of the resources, a request to the compression proxy service 104 at 408, the content delivery network 106 at 410, or the origin site 108 at 412.

Upon receipt of a request for one of the resources as instructed by the manifest 112, the compression proxy service 104 delivers a compressed version of the requested resource from the cache 118 (if stored there) or obtains the resource from the origin site 108 on demand and compresses the resource before delivering the compressed version of the requested resource to the user device 102.

In some embodiments, the operations illustrated in FIG. 4 are implemented by the computer-executable components illustrated in FIG. 1. For example, the network stack component 122, when executed by a processor of the user device 102, causes the user device 102 to detect the request for the web page. The interface component 124, when executed by a processor of the user device 102, causes the user device 102 to receive the manifest 112 associated with the web page in the request detected by the network stack component 122. In some embodiments, the interface component 124 includes a network interface card and/or computer-executable instructions (e.g., a driver) for operating the network interface card. Communication between the user device 102 and other devices may occur using any protocol or mechanism over any wired or wireless connection.

The redirection component 126, when executed causes a processor of the user device 102 to parse the manifest 112 received by the interface component 124 to identify a first one of the resources to obtain as compressed data from a first network location (e.g., the compression proxy service 104) and a second one of the resources to obtain as uncompressed data from a second network location (e.g., the origin site 108 or other web site).

The network stack component 122 further requests the first one of the resources from the first network location and the second one of the resources from the second network location. For example, the network stack component 122 sends hypertext transfer protocol (HTTP) requests to the network locations.

Additional Examples

In some embodiments, the compression proxy service 104 updates created manifests 112 based on a subsequent evaluation of the compressed resources or after re-compression of the resources. For example, during peak usage times (e.g., high processor usage) of the compression proxy service 104, the compression proxy service 104 may compress resources quickly with less compression. During a subsequent off-peak usage time (e.g., low processor usage), the compression proxy service 104 may attempt to re-compress the resources more thoroughly, which may result in greater compression of the resources. The compression proxy service 104 is then able to generate updated compression characteristics and evaluate the updated compression characteristics to determine whether the previously-created manifest 112 should be updated.

At least a portion of the functionality of the various elements in the figures may be performed by other elements in the figures, or an entity (e.g., processor, web service, server, application program, computing device, etc.) not shown in the figures.

In some embodiments, the operations illustrated in FIGS. 2, 3, and 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selective compression of resources associated with the web page to reduce network traffic associated with the compression proxy service 104, and exemplary means for performing machine learning operations to dynamically update the manifest 112 based on the generated at least one compression characteristic. For example, the processor 114 programmed to perform the algorithms illustrated in FIG. 2 constitutes such exemplary means.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

The structure of an exemplary manifest 112 is shown below.

```
<?xml version="1.0" encoding="utf-8"?>
<PageManifest>
 <UrlHash>c2fb3dc21869d763651bbd1e764e0569eb91c476</UrlHash>
 <AcceptLanguage>en-us</AcceptLanguage>
 <Version>1</Version>
 <SequenceNumber>42</SequenceNumber>
 <Flags>42</Flags>
 <CdnResources>
  <Hash>11223300</Hash>
  <Hash>44556677</Hash>
 </CdnResources>
 <ExcludedResources>
  <Hash>ffeeddcc</Hash>
  <Hash>aa998877</Hash>
 </ExcludedResources>
 <ExclusionRules>
   <Value>WEBSITE/*/jpg/*</Value>
   <Value>WEBSITE/*</Value>
 </ExclusionRules>
</PageManifest>
```

In the above example, the CdnResources field contains the set of short hashes of the URLs pushed by the compression proxy service 104 to the content delivery network 106. The ExcludedResources field contains the set of short hashes of the URLs the user device 102 should request from the origin site 108. The ExcludedDomains field contains the set of domains the user device 102 should request from the origin site 108. The ExclusionRules field includes rules used to identify a group of resources that should be requested from the origin site 108. The ExcludedExtensions field includes extensions of resources the user device 102 should request from the origin site 108. A Last-Modified field indicates the time when the manifest 112 was last modified.

Any resource not excluded in the ExcludedResources field, the ExcludedDomains field, the ExcludedExtensions field, or the ExclusionRules field is to be requested from the compression proxy service 104.

Appendix B

Aspects of the disclosure are operable with any configuration settings for interpreting requests for web pages to create manifests 112 for the web pages. Listed below are exemplary threshold settings relating to collecting popularity counts for the web pages.

```
/// <summary>
/// Gets or sets the cdn popularity counter life time.
/// </summary>
[ConfigurationMember]
public int CdnPopularityIndexLifespanInMinutes
{
    get;
    set;
}
/// <summary>
/// Gets or sets the count to be hit within
CdnPopularityIndexLifeSpanInMinutes before a resource is marked as
popular.
/// </summary>
[ConfigurationMember]
public long CdnPopularityThreshold
{
    get;
    set;
}
/// <summary>
/// Gets or sets the count to be hit within
CdnPopularityIndexLifeSpanInMinutes before a resource is marked as
popular.
/// </summary>
[ConfigurationMember]
public long PagePopularityThreshold
{
    get;
    set;
}
/// <summary>
/// Gets or sets the cdn popularity counter life time.
/// </summary>
[ConfigurationMember]
public int PagePopularityIndexLifespanInMinutes
{
    get;
    set;
}
```

As an example, if PagePopularityThreshold=10 and PagePopularityIndexLifespanInMinutes=15 for a web page, aspects of the disclosure process the web page only after receiving 10 requests from users for the web page and only if the time between two successive requests is approximately less than 15 minutes (e.g., otherwise the counter expires and resets to zero).

Listed below are exemplary settings for managing the contents of the manifests 112.

```
/// <summary>
/// Whole page exclusion ratio. If at least this ratio of
bytes on the page is not saved then the whole page will be excluded
from the system.
/// </summary>
[ConfigurationMember]
public double BytesSavedVsBytesSentWholePageExclusionRatio { get; set; }
/// <summary>
/// The max clipping age, in seconds, for items in the
CdnResources collection. This is a lower time than
CdnResourcesMaxAgeInSeconds and it is used when the size is
exceeding
///    CdnResourcesMaxSize.
/// </summary>
[ConfigurationMember]
public int CdnResourcesClippingMaxAgeInSeconds { get; set; }
/// <summary>
/// The max age, in seconds, for items in the CdnResources
collection. Items are removed after they exceed this age (if they
are still needed they will come right back in the next cycle).
/// </summary>
[ConfigurationMember]
public int CdnResourcesMaxAgeInSeconds { get; set; }
/// <summary>
/// The maximum number of CdnResources to be allowed in the
manifest. The allowed range is what was specified in the threat
model as the max size of items of this type in the manifest.
/// </summary>
[ConfigurationMember]
[IntegralRange(Min = a, Max = b)]
public int CdnResourcesMaxSize { get; set; }
/// <summary>
/// The max clipping age, in seconds, for items in the
ExcludedResources collection. This is a lower time than
ExcludedResourcesMaxAgeInSeconds and it is used when the size is
exceeding
///    ExcludedResourcesMaxSize.
/// </summary>
[ConfigurationMember]
public int ExcludedResourcesClippingMaxAgeInSeconds { get; set; }
/// <summary>
/// The max age, in seconds, for items in the
ExcludedResources collection. Items are removed after they exceed
this age (if they are still needed they will come right back in the
next cycle).
/// </summary>
[ConfigurationMember]
public int ExcludedResourcesMaxAgeInSeconds { get; set; }
/// <summary>
/// The maximum number of ExcludedResources to be allowed in
the manifest. The allowed range is what was specified in the threat
model as the max size of items of this type in the manifest.
/// </summary>
[ConfigurationMember]
[IntegralRange(Min = c, Max = d)]
public int ExcludedResourcesMaxSize { get; set; }
/// <summary>
/// The override threshold for the exclusion rule
processing. If there are some resources in both the included and
excluded sets that are matched by the same rule, then include each
of the resources only if the combined savings percent is above this
threshold.
/// </summary>
[ConfigurationMember]
public double ExclusionRuleIncludeOverrideThresholdPct { get; set; }
/// <summary>
/// The max age, in seconds, for items in the ExclusionRules
collection. Items are removed after they exceed this age (if they
are still needed they will come right back in the next cycle).
/// </summary>
[ConfigurationMember]
public int ExclusionRuleMaxAgeInSeconds { get; set; }
/// <summary>
/// The maximum number of ExclusionRules to be allowed in
the manifest. The allowed range is what was specified in the threat
model as the max size of items of this type in the manifest.
/// </summary>
[ConfigurationMember]
[IntegralRange(Min = e, Max = f)]
public int ExclusionRuleMaxSize { get; set; }
/// <summary>
/// Max time, in seconds, that a manifest can be cached.
/// </summary>
[ConfigurationMember]
public int ManifestTTLMaxInSeconds { get; set; }
/// <summary>
/// Min time, in seconds, that a manifest can be cached.
/// </summary>
[ConfigurationMember]
public int ManifestTTLMinInSeconds { get; set; }
/// <summary>
/// The max clipping age, in seconds, for items in the
Resources collection. This is a lower time than
ResourcesMaxAgeInSeconds and it is used when the size is exceeding
///    ResourcesMaxSize.
/// </summary>
```

```
[ConfigurationMember]
public int ResourcesClippingMaxAgeInSeconds { get; set; }
/// <summary>
/// The max age, in seconds, for items in the Resources
collection. Items are removed after they exceed this age (if they
are still needed they will come right back in the next cycle).
/// </summary>
[ConfigurationMember]
public int ResourcesMaxAgeInSeconds { get; set; }
/// <summary>
/// The maximum number of Resources to be allowed in the
manifest.
/// </summary>
[ConfigurationMember]
public int ResourcesMaxSize { get; set; }
```

What is claimed is:

1. A method comprising:
receiving, by a compression proxy service, a request for a plurality of resources;
compressing the requested plurality of resources;
generating compression characteristics based on the compressing of the requested plurality of resources;
evaluating the generated compression characteristics of the requested plurality of resources;
selecting one or more of the resources based on the evaluated compression characteristics; and
defining a manifest, indicating the selected one or more of the resources therein, for use by a computing device to subsequently identify which of the plurality of resources to obtain from the compression proxy service, wherein defining the manifest comprises updating a previously defined manifest.

2. The method of claim 1, further comprising obtaining the requested plurality of resources.

3. The method of claim 1, wherein evaluating the compression characteristics comprises comparing the compression characteristics to corresponding compression threshold values.

4. The method of claim 1, wherein evaluating the compression characteristics comprises comparing the compression characteristics to at least one of the following: a threshold compression rate or a threshold compression quality.

5. The method of claim 1, further comprising caching, by the compression proxy service, compressed versions of only the selected one or more of the resources.

6. The method of claim 5, further comprising:
receiving a request for a web page, the web page having the selected one or more of the resources associated therewith; and
providing, in response to the received request, the cached, compressed versions of the selected one or more of the resources.

7. The method of claim 1, further comprising:
identifying at least one of the resources, based on at least one of a popularity of the plurality of resources or a frequency of requests for the plurality of resources; and
updating the manifest to indicate that the identified at least one of the resources should be obtained from a content delivery network.

8. The method of claim 1, wherein the evaluating, the selecting, and the updating correspond to machine learning operations.

9. The method of claim 1, wherein receiving the request comprises receiving a request for a web page, and further comprising identifying the plurality of resources associated with the web page.

10. The method of claim 1, wherein receiving the request comprises receiving a request for a web page, and wherein said evaluating, said selecting, and said defining are performed only after the computing device receives a threshold quantity of requests for the web page.

11. The method of claim 1, wherein the manifest includes an indication whether, based on the evaluation of the compression characteristics of the requested plurality of resources, the selected one or more resources should be obtained from the compression proxy service or from a content delivery network.

12. A system for selective use of a compression proxy service to reduce network traffic when rendering web pages, said system comprising:
a memory area associated with a compression proxy service, said memory area storing a manifest associated with a web page; and
a processor programmed to:
compress, in response to a first request for the web page, a plurality of resources associated with the web page;
generate compression characteristics relating to the compression of the plurality of resources;
evaluate the compression characteristics relating to the compression of the plurality of resources;
store in the manifest, the evaluated compression characteristics relating to the compression of the plurality of resource; and
provide, in response to a second request for the web page from a computing device, the manifest stored in the memory area to the computing device for use by the computing device to determine whether, based on the evaluated compression characteristics stored in the provided manifest, to obtain one or more of the compressed resource from the compression proxy service, wherein said storing the evaluated compression characteristics in the manifest comprises updating a previously stored manifest.

13. The system of claim 12, wherein the stored evaluated compression characteristics indicate that the resource should be obtained from a content delivery network instead of the compression proxy service.

14. The system of claim 12, wherein the processor is further programmed to obtain the plurality of resources associated with the web page.

15. The system of claim 12, wherein the processor stores an indication in the manifest whether, based on the evaluation, the one or more of the compressed resources should be obtained from the compression proxy service.

16. The system of claim 12, further comprising:
means for selective compression of resources associated with the web page to reduce network traffic associated with the compression proxy service; and
means for performing machine learning operations to dynamically update the manifest based on the generated compression characteristics.

17. One or more computer storage media embodying computer-executable instructions that when executed by at least one processor causes the at least one processor to perform operations comprising:
compressing, in response to a first request for a web page, a plurality of resources associated with the web page;
generating compression characteristics relating to the compression of the plurality of resources;
evaluating the compression characteristics relating to compression of the plurality of resources;

storing, in a manifest stored in a memory area, the evaluated compression characteristics relating to compression of the plurality of resource; and providing, in response to a second request for the web page from a computing device, the manifest stored in the memory area to the computing device for use by the computing device to determine whether, based on the evaluated compression characteristics stored in the provided manifest, to obtain one or more of the compressed resource from the compression proxy service, wherein said storing the evaluated compression characteristics in the manifest comprises updating a previously stored manifest.

18. The computer storage media of claim 17, wherein evaluating the compression characteristics comprises comparing the compression characteristics to corresponding compression threshold values.

19. The computer storage media of claim 17, wherein evaluating the compression characteristics comprises comparing the compression characteristics to at least one of a threshold compression rate or a threshold compression quality.

20. The computer storage media of claim 17 embodying further computer-executable instructions that when executed by the at least one processor causes the at least one processor to further perform operations comprising:

identifying at least one of the resources, based on at least one of a popularity of the plurality of resources or a frequency of requests for the plurality of resources; and updating the manifest to indicate that the identified at least one of the resources should be obtained from a content delivery network.

* * * * *